(12) United States Patent
Rietschin

(10) Patent No.: US 12,253,163 B1
(45) Date of Patent: Mar. 18, 2025

(54) ADAPTIVE GEAR CHANGE STRATEGY

(71) Applicant: Axel Rietschin, Sammamish, WA (US)

(72) Inventor: Axel Rietschin, Sammamish, WA (US)

(73) Assignee: RIETSCHIN TECHNOLOGY LICENSING, LLC, Sammamish, WA (US)

( * ) Notice: Subject to any disclaimer, the term of this patent is extended or adjusted under 35 U.S.C. 154(b) by 0 days.

(21) Appl. No.: 18/141,464

(22) Filed: Apr. 30, 2023

(51) Int. Cl.
*F16H 59/48* (2006.01)
*F16H 59/36* (2006.01)
*F16H 59/44* (2006.01)
*F16H 59/66* (2006.01)
*F16H 61/02* (2006.01)

(52) U.S. Cl.
CPC ......... *F16H 61/0213* (2013.01); *F16H 59/36* (2013.01); *F16H 59/44* (2013.01); *F16H 59/48* (2013.01); *F16H 59/66* (2013.01); *F16H 2059/366* (2013.01); *F16H 2059/663* (2013.01); *F16H 2061/0216* (2013.01); *F16H 2061/022* (2013.01); *F16H 2061/0223* (2013.01)

(58) Field of Classification Search
CPC .......... F16H 59/36; F16H 59/44; F16H 59/48; F16H 59/66; F16H 2059/366; F16H 2059/663; F16H 61/02; F16H 2061/022; F16H 2061/0216; F16H 2061/0223
USPC ....................................... 701/55, 58
See application file for complete search history.

(56) References Cited

U.S. PATENT DOCUMENTS

| | | | | |
|---|---|---|---|---|
| 6,226,584 B1 * | 5/2001 | Carlson | ................... | F16H 61/10 701/55 |
| 8,068,964 B2 * | 11/2011 | Wolfgang | ........... | F16H 61/0213 701/55 |
| 11,118,678 B2 * | 9/2021 | Ooshima | ................ | F16H 59/44 |
| 2010/0121543 A1 * | 5/2010 | Landes | ............... | F16H 61/0213 701/55 |
| 2019/0331214 A1 * | 10/2019 | Futamura | ................ | F16H 59/40 |

* cited by examiner

*Primary Examiner* — Roger L Pang

(57) ABSTRACT

A method allowing the determination of the optimal gear shift engine speeds for a self-propelled vehicle equipped with a multi-gear transmission.

1 Claim, 1 Drawing Sheet

Figure 1 - Acceleration plot for each gear (1-6) vs. vehicle speed; Intersections between curves circled.

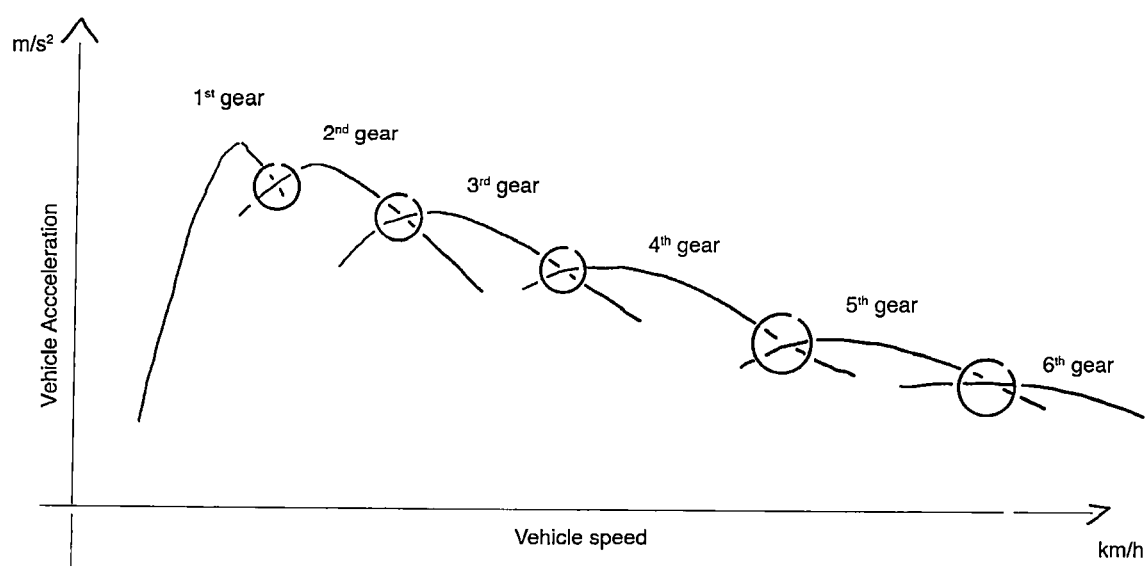
Figure 1 - Acceleration plot for each gear (1-6) vs. vehicle speed; Intersections between curves circled.

ADAPTIVE GEAR CHANGE STRATEGY

BACKGROUND OF THE INVENTION

Self-propelled vehicles equipped with a transmission system that includes a plurality of gear ratios face the problem of determining when to switch gears. Traditionally, the gear change points for maximum performance or maximum economy are determined as a function of the propulsion and transmission system's characteristics. Taking the internal combustion engine as an example, and the maximum acceleration case also as an example, the gear change points are traditionally determined by considering the gear ratios, the engine speed drop between gears, and the engine's power curve.

This approach, however, neglects the effects of the environment. The vehicle is subjected to various external influences: the aerodynamic drag, which grows with the vehicle speed and varies with the ambient temperature; the rolling resistance, which also grows with the vehicle speed; the effect of internal frictions; and the effect of gravity, where a vehicle accelerates quicker on a steep descent and slower on a steep ascent.

For clarity, the remaining of this document relates to the internal combustion engine case onboard a terrestrial vehicle equipped with one or more wheels and a transmission system including a plurality of gear ratios. However, the invention is in no way constrained by or restricted to this particular case beyond the concept of self-propelled vehicles equipped with a transmission system that includes a plurality of gear ratios.

SUMMARY OF THE INVENTION

The invention considers external factors as contributors determining the "available power" that is left to accelerate the vehicle after all the losses are subtracted and after the effect of gravity is taken into consideration. Instead of considering the engine's power curve in itself, a new curve resulting from the engine's power curve after the subtraction of all losses and the addition or subtraction of the effects of gravity is considered. That new curve is named the "Available Power Curve" and expresses whatever power is left to accelerate the vehicle after all external influences are taken into account. The shape of the Available Power Curve is directly influenced by the aerodynamic losses, the friction losses, as well as the effect of gravity. Therefore, it is different for each gear as the vehicle speed increases, reflecting the effect of the aerodynamic losses and of any rolling resistance. On any gear, the internal friction losses also increase as the engine speed increases and therefore contribute to the losses incurred. When the vehicle reaches its top speed on the last gear, the point of view adopted herein from the perspective of the Available Power Curve is that there is no power left to accelerate the vehicle: regardless of the power produced by the engine at that moment, the losses entirely negate it, and the resulting Available Power is, therefore, zero at the vehicle's top speed. The Available Power Curve on the last gear, therefore, indicates zero at the vehicle's top speed and is thus substantially different from the engine's power curve, which likely is at or near its peak—in any case, not zero—at the engine speed corresponding to the vehicle's top speed.

Considering the Available Power Curve when determining the optimal engine speed at which to change individual gears is, therefore, substantially different from considering the engine's power curve. We go as far as asserting that the engine's power curve is irrelevant and that only the Available Power Curve matters.

The invention consists of the introduction of the Available Power Curve abstract concept, its use in determining the optimal gear shift engine speeds, and a practical method to determine optimal gear shift engine speeds for each gear that dynamically incorporates the effect of all influences affecting a vehicle's acceleration.

BRIEF DESCRIPTION OF DRAWINGS

FIG. 1—Acceleration plot for each gear (1-6) vs. vehicle speed; Intersections between curves circled.

DETAILED DESCRIPTION OF THE INVENTION

For clarity, this detailed description relates to the internal combustion engine case onboard a terrestrial vehicle equipped with one or more wheels and a transmission system including a plurality of gear ratios. However, the invention is in no way constrained by or restricted to this particular case beyond the concept of self-propelled vehicles equipped with a transmission system that includes a plurality of gear ratios.

To maximize a vehicle's acceleration, it is necessary to maximize the power applied to the wheels.

As the vehicle accelerates, so does the engine that propels it.

In first approximation, the power output of a given internal combustion engine is a function of the torque it produces times its rotation speed.

In practice, an engine's power output is described by a set of curves named the power and torque curves, which relates the power and torque output as a function of engine speed.

The useable portion of the engine's power curve is referred to as the "power band," namely the range of rotation speeds within which the engine produces most of its power. It is easy to see that the maximum acceleration will be achieved by maximizing the area under the engine's power curve that is swept during accelerating on a given gear.

The transmission multiplies the torque sent to the wheels by dividing the engine speed by the current gear ratio and the final ratio. The wheel's rotation speed multiplied by the rolling radius results in a FIGURE known as the power at the wheel.

At any given vehicle speed, the vehicle that accelerates the harder is the one producing the most power at the wheel.

Changing the gearing directly affects the power at the wheel at a given vehicle speed, as it directly affects how the engine torque is multiplied. Intuitively, and by common knowledge, it is easy to see that a vehicle traveling at a given speed can accelerate harder on a shorter (lower) gear than on a longer (higher) one. For example, it is common to downshift to a lower gear immediately before performing a passing maneuver to maximize vehicle acceleration.

Let's remember that torque is a moment, i.e., an instantaneous force with no duration. A force without duration, no matter how strong, is not going to make the vehicle do anything.

Let an object of mass m. From F=ma (Newton's second law of motion), we see that a=F/m. If F=300N and m=1200 kg the acceleration of the object will be equal to 0.25 m/s$^2$, which means the velocity of the object will increase by 0.25 m/s for each second a force is applied.

What accelerates the vehicle is thus the repeated and continuous application of the force, in our case, the torque applied to the driven wheel(s). But then, a torque value multiplied by its rate of application is exactly the definition of power, neglecting a multiplicative constant.

It is, therefore, the maximization of the power at the wheel that maximizes acceleration, and the power at the wheel is not just a function of the engine torque/power but of the torque reaching the wheel after being multiplied by the gearbox and final ratios, i.e., the total ratio. The torque applied to the wheels is also affected by the losses internal to the drivetrain.

From there, for a given engine and vehicle, it is essential to select the proper gear ratio at the appropriate time to maximize the power at the wheel and, from there, the vehicle acceleration at a given vehicle speed.

The novelty of this invention is to also consider external factors as contributors to determining the available power that is left to accelerate the vehicle after all the losses are subtracted and after the effect of gravity is taken into consideration.

The main loss comes from the aerodynamic drag, which grows with the square of the speed, and is approximated by the following formula:

$$F_D = \frac{1}{2}\rho v^2 C_D A$$

Where $F_D$=drag force, $\rho$=air density, v=vehicle speed, $C_D$=drag coefficient and A=cross-sectional area.

The power $P_D$ required to overcome the aerodynamic drag is given by:

$$P_D = F_D \times v = \frac{1}{2}\rho v^3 C_D A$$

One readily sees that the power required to overcome aerodynamic drag grows with the cube of the speed and thus quickly becomes the dominant loss as the vehicle speed increases, as other factors, such as rolling resistance or internal frictions, grow linearly with the vehicle speed.

When the losses are subtracted from the engine power, one can see that the resulting Available Power left to accelerate the vehicle is not only lessened by the losses but, more crucially—given the power required to overcome the losses grows rapidly as the vehicle accelerates, the power curve's maxima also shift towards the left, as more and more power is robbed, as the vehicle speed increases.

This directly affects the Available Power Curve's shape, where the curve flattens as the engine speed increases, flattens even more as the vehicle speed increases, and the power maxima shifts leftward more and more.

It follows that the RPM range where the most power is available shifts leftwards and is not the same as what can be observed on an engine test cell, where the engine is statically driving a brake that measures its output torque without accounting for the environmental forces at play when the vehicle is moving against the environment.

As a result, in first approximation and due to the change in the shape of the Available Power Curve, with a shift of the peak Available Power towards lower engine speeds as the losses increase, the ideal shift engine speeds should generally decrease as the vehicle speed increases.

Engines where the peak power coincides with the peak engine speed are also subject to this phenomenon: as the vehicle speed increases, there is a point where the cubic growth of the aerodynamic-drag-induced power losses dominates the engine's power increase with regards to its speed: the Available Power curve shifts downward and to the left, before the engine reached its top speed, therefore the peak Available Power does not coincide with the peak engine power, and that difference increases with the amount of losses.

The losses due to rolling resistance should also be subtracted from the engine's power curve.

Finally, the effect of gravity adds or subtracts to or from engine power as the potential energy:

$$E_P = mgh$$

where m=mass, g=9.8 m/s^2 and h=height difference. Intuitively, a vehicle accelerates slower going uphill and faster going downhill: as a result, the engine can conceptually be seen as "more powerful" going downhill as gravity partially offsets the aerodynamic and rolling resistance losses. Conversely, the engine can be seen as "less powerful" going uphill as the effect of gravity adds to the existing losses.

Adding/subtracting the effect of gravity on the engine's power curve influence the shape of the Available Power Curve and, as such, influences the optimal gear change engine speeds.

From Newton's second law, we know that the mass of the vehicle also affects its acceleration. We also know that the mass of the vehicle varies as time passes, as fuel and any other consumables present onboard are depleted. The point of view introduced by this invention sees the engine conceptually becoming a little more powerful as the weight of the vehicle decreases as time passes.

It is difficult to model all conditions and compute the optimal gear change RPM for each gear using the above. Moreover, changing conditions such as air temperature and vehicle weight are difficult to factor in accurately.

To overcome these difficulties, this invention proposes an empirical method based on observed vehicle acceleration and vehicle speed in each gear based on the vehicle speed, the slope of the road or track and the vehicle acceleration.

The vehicle speed is derived directly or indirectly either using wheel speed sensors, non-contact speed sensors (such as a Doppler-effect radar measuring the "ground speed" or an optical flow sensor), or other means. The vehicle speed can also be obtained indirectly from its change in location over time using satellite navigation systems receivers (GNSS), possibly with assistance from ground stations to improve their accuracy. Those systems provide relatively accurate position and timing information which can be used to deduce the speed-over-ground of the vehicle.

The slope can be deduced from a change in altitude or measured directly with an inclinometer device. The altitude can be looked up from position data (based on pre-existing topographic data) or obtained from a GNSS receiver mentioned previously. The variation in altitude can also be inferred from barometric pressure, where a barometric pressure sensor onboard the vehicle is used to deduce altitude variations from a combination (sensor fusion) of two or more of the techniques: positional with topographic data, GNSS, and barometric pressure.

The vehicle acceleration can be measured using an onboard inertial platform, either composed of one or more accelerometers, preferably augmented by gyrometers ("gyroscopes") and electronic compass (magnetometer) forming, together with the barometric pressure sensor, a multi-axis inertial measurement unit (IMU) from which the vehicle acceleration can be measured accurately. The sensor data can be fused using specialized sensor fusion algorithms, for example belonging to the Kalman filter family (KF, EKF, UKF . . . ) to provide attitude, heading, and orientation data in addition to acceleration data.

The first step of the empirical method consists in recording the vehicle acceleration data on flat ground in each gear over the entire useable range of engine speeds, together with the vehicle speed. By its nature, the observed acceleration factors in all the losses incurred. The acceleration vs. engine speed curve on a given gear will rise sharply on short gears, reach a peak, and fall sharply as the engine approaches its maximum speed. The curve will follow the same pattern on the next gear, with the following two changes: the curve will rise less steeply, the peak will be lower and less "pointy," and the falloff will be smoother. On the last gear, the curve rises very slowly, the peak is round, and the curves fall slowly as the vehicle approaches its top speed.

By drawing each acceleration curve on the same graph, where the vehicle speed from zero to its top speed makes up the whole horizontal axis and the vertical axis depicts the measured intensity of the acceleration, and where the recorded acceleration is potted at the vehicle speed at which it was recorded, one can readily see where the curves intersect, and the intersections are exactly the points where the vehicle acceleration, at a given vehicle speed, is equal on a given gear and on the next gear. Those points are the ideal gear change points. See FIG. 1—Acceleration plot for each gear (1-6) vs. vehicle speed; Intersections between curves circled.

From the gear and final ratios and knowing the driven wheel(s) circumferences, it is easy to deduce the optimal change RPM for each gear, solely based on the recorded acceleration and vehicle speed, with the goal of "riding the higher curve," i.e., change gears at the instant the acceleration in the current gear decreases to be the same as what the acceleration would be at that vehicle speed on the next gear.

In a possible embodiment, the curves can be stored in the memory of a computing device, for example, the engine's control unit, and used in the determination of the optimal gear change points.

The engine control unit in the possible embodiment can perform measurements of the vehicle acceleration and of the slope in real time, apply correction factors to the stored curves for each gear, and fine-tune the gear change points dynamically.

For example, knowing the slope, a pre-determined factor can readily be applied to the expected acceleration curve for each gear, moving the intersection point and, therefore, the shift point.

In addition to the slope, changes in vehicle setup (for example, adjustments to aerodynamic appendices affecting the vehicle's drag) can be taken into account either using pre-determined data stored in the control unit, where the appropriate correction factor can be applied directly to the stored acceleration curves, or inferred from any unexpected differences between the measured acceleration and the acceleration values stored in the control unit. The program code executing on the control unit can then consider the difference and deduce a correction factor to scale the acceleration curve and better determine the ideal shift points.

Changes in ambient temperature, vehicle weight, or engine performances are also immediately visible as a difference between the expected acceleration and the effective acceleration, also allowing the control unit to compute a correction factor that affects their influence on the stored acceleration curves, further refining the crossing points and therefore the optimal gear change engine speeds.

The empirical method described above takes all factors into account as it measures the final acceleration result, which is the result of the sum of all power sources less the sum of all losses. It also takes into account any change in conditions affecting the vehicle's acceleration, which is measured directly, as well as the slope onto which the vehicle moves, which together provide an actual "linear" acceleration value that is easily compared to the expectations, and where any difference can be interpreted as a "loss" or "gain" in Available Power, which in turn affects the shape of the acceleration curves, and therefore their intersection points and from there the ideal shift speeds.

The invention claimed is:

1. A method enabling the determination of optimal gear shift engine speeds for each gear on a vehicle equipped with a multi-gear transmission consisting of: measuring and recording vehicle acceleration on a flat ground and over a full range of engine speeds allowed on each gear as measured data; and storing the measured data in non-transitory storage as a graph of acceleration vs. vehicle speed curves; and determining where the acceleration vs. vehicle speed curves intersect; and from a total gear ratio and rolling radius (or wheel diameters), determining the engine speed corresponding to a lower of the intersecting curves at a respective intersection point; and performing the measuring and storing on various slopes to infer the effect of gravity on the vehicle's acceleration; and a computing device having access to the measured data and which, by real-time observations of the physical behavior of the vehicle, including the current gear, observed acceleration, and vehicle speed; determining the optimal gear change speeds based on the stored acceleration speed vs. vehicle speed; and adjusting the optimal gear change speeds dynamically as a function of a currently observed slope onto which the vehicle moves; and adjusting the optimal gear change speeds dynamically as a function of any difference between an expected acceleration and the measured acceleration.

* * * * *